United States Patent
Carter

(10) Patent No.: US 8,205,265 B2
(45) Date of Patent: *Jun. 19, 2012

(54) TECHNIQUES TO POLLUTE ELECTRONIC PROFILING

(75) Inventor: Stephen R. Carter, Spanish Fork, UT (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,672

(22) Filed: Oct. 21, 2011

(65) Prior Publication Data

US 2012/0042001 A1 Feb. 16, 2012

Related U.S. Application Data

(63) Continuation of application No. 11/257,614, filed on Oct. 25, 2005, now Pat. No. 8,069,485.

(51) Int. Cl.
*G06F 7/04* (2006.01)

(52) U.S. Cl. ........................................................ 726/26

(58) Field of Classification Search .................... 726/23, 726/26

See application file for complete search history.

(56) References Cited

U.S. PATENT DOCUMENTS

| | | | |
|---|---|---|---|
| 5,931,934 A | 8/1999 | Li et al. | |
| 6,088,516 A | 7/2000 | Kreisel et al. | |
| 6,539,430 B1 | 3/2003 | Humes | |
| 6,720,990 B1 | 4/2004 | Walker et al. | |
| 2002/0038431 A1 | 3/2002 | Chesko et al. | |
| 2002/0049963 A1 | 4/2002 | Beck et al. | |
| 2003/0220913 A1 | 11/2003 | Doganata et al. | |
| 2004/0109061 A1 | 6/2004 | Walker et al. | |
| 2004/0181683 A1 | 9/2004 | Jia et al. | |
| 2005/0198099 A1* | 9/2005 | Motsinger et al. | 709/200 |
| 2005/0289058 A1 | 12/2005 | Hoffman et al. | |
| 2006/0140361 A1 | 6/2006 | Heikes et al. | |
| 2007/0094725 A1* | 4/2007 | Borders | 726/22 |
| 2007/0094738 A1 | 4/2007 | Carter | |

OTHER PUBLICATIONS

Balint, Kathryn, "Chatterbots' can get a little too real", (Mar. 10, 2001), 1-5.

* cited by examiner

*Primary Examiner* — Jeffrey D Popham

(74) *Attorney, Agent, or Firm* — Schwegman, Lundberg & Woessner, P.A.

(57) ABSTRACT

Techniques to pollute electronic profiling are provided. A cloned identity is created for a principal. Areas of interest are assigned to the cloned identity, where a number of the areas of interest are divergent from true interests of the principal. One or more actions are automatically processed in response to the assigned areas of interest. The actions appear to network eavesdroppers to be associated with the principal and not with the cloned identity.

8 Claims, 3 Drawing Sheets

TECHNIQUES TO POLLUTE ELECTRONIC PROFILING

RELATED APPLICATIONS

The present Application claims priority to, and is a continuation of U.S. patent application Ser. No. 11/257,614, now issued as U.S. Pat. No. 8,069,485, entitled: "Techniques to Pollute Electronic Profiling," filed on Oct. 25, 2005, which presently stands allowed; and the disclosure of which is incorporated by reference herein in its entirety.

FIELD

The invention relates generally to electronic privacy and more particularly to techniques to pollute electronic profiling.

BACKGROUND

A significant concern with electronic commerce and with the proliferation of electronic transactions is that of privacy. Individuals, particularly American citizens, have always been suspect of the motivations and actions of their government and "Big Business." This skepticism has given rise to a variety of privacy laws and rights enjoyed by American citizens, which remains the envy of much of the rest of the world. As electronic commerce has grown by leaps and bounds in recent years, users have now become increasingly concerned with confidential information that is being gathered and collected about them. The information is being collected by lawful and unlawful enterprises and the information gathering is not exclusively limited to governments.

In some cases, the electronic information being gathered is used for illegal purposes, such as electronic identity theft. In other cases, the information is gathered for lawful purposes but is extremely annoying to users, such as when targeted and aggressive marketing tactics are used. Users are growing uncomfortable with the amount of information marketers possess today about them and many feel it is an invasion of their privacy even if the marketing is currently considered to be lawful. Moreover, even legitimate and lawful enterprises that collect confidential information about a user runs the risk of having an intruder penetrate their databases and acquiring the information for subsequent unlawful purposes.

Concerns about the government and its knowledge about its citizenry is often referred to in a derogatory sense as actions of "Big Brother" who is omnipresent and gathering information to use to its advantage when needed. The electronic age has given rise to what is now known as thousands of "Little Brothers," who perform Internet surveillance by collecting information to form electronic profiles about a user not through human eyes or through the lens of a camera but through data collection. This form of Internet surveillance via data collection is often referred to as "dataveillance." In a sense, thousands of "Little Brothers" or automated programs can monitor virtually every action of users over the Internet. The data about a user can be accumulated and combined with other data about the user to form electronic profiles of the users.

Even famous authors have foreseen and speculated about the problems associated with invading privacy. Consider Orwell who gave rise to the concept of an Orwellian society from the Big Brother of his novel, 1984. In that novel, Big Brother is the government, which has managed to invade privacy to the point where every dwelling was equipped with a "tele-screen" which, while providing entertainment and information access to the user, also allowed Big Brother to observe visually and audibly the occupants of the dwellings. Of course, Big Brother knew that the observed behavior of the dwelling occupants was not strictly the "true persona" of those being observed, but rather was what the "true persona" Big Brother wanted to observe. This, however, was immaterial to Big Brother because Big Brother knew that if it could foster a set of behavior that was consistently portrayed over a given period of time, then the "true persona" would begin to morph into another person that was, at its core, what the behaviors were designed to foster. Thus, Big Brother was also known as the "Thought Police," which was very successful at conditioning the masses and eliminating the non-conformists.

In fact, users are becoming so concerned about dataveillance that a booming industry has arisen that attempts to thwart the data collection. Some examples include "anonymizers" and "spyware killers." Anonymizers attempt to make transactions anonymous, such as by using a fictitious user name for a given transaction. Spyware Killers detect programs that self-install on a user's device and monitor Internet actions of that user and then report the monitoring information back to a marketer or other entity.

Even without anonymizers and spyware killers, users may still attempt as best they can to deter data collection by taking manually initiated evasive actions. For example, a user may turn off cookies within the browser, may refuse to register for a service that requests an email address or other confidential information, or may refuse to perform a transaction at all when the user is suspect of that transaction.

Yet even if all available techniques are adopted and taken by a user, information about the user is likely to still be successfully collected if the user engages in electronic commerce over the Internet, engages in information gathering over the Internet, or engages in downloading and installing services over the Internet. In a sense if the user engages in any Internet activity, information may be successfully collected about that user. Thus, even the most cautious Internet users are still being profiled over the Internet via dataveillance techniques from automated Litter Brothers.

SUMMARY

In various embodiments, techniques for polluting electronic profiling are presented. More specifically, and in an embodiment, a method for processing a cloned identity over a network is provided. An identity associated with a principal is cloned to form a cloned identity. Areas of interest are assigned to the cloned identity and actions are automatically processed over a network, where the actions are associated with the areas of interest for the cloned identity. The actions are processed in order to pollute information gathered about the principal from eavesdroppers monitoring the network. The actions appear to the eavesdroppers to be associated with the principal.

DETAILED DESCRIPTION

Figure 1:
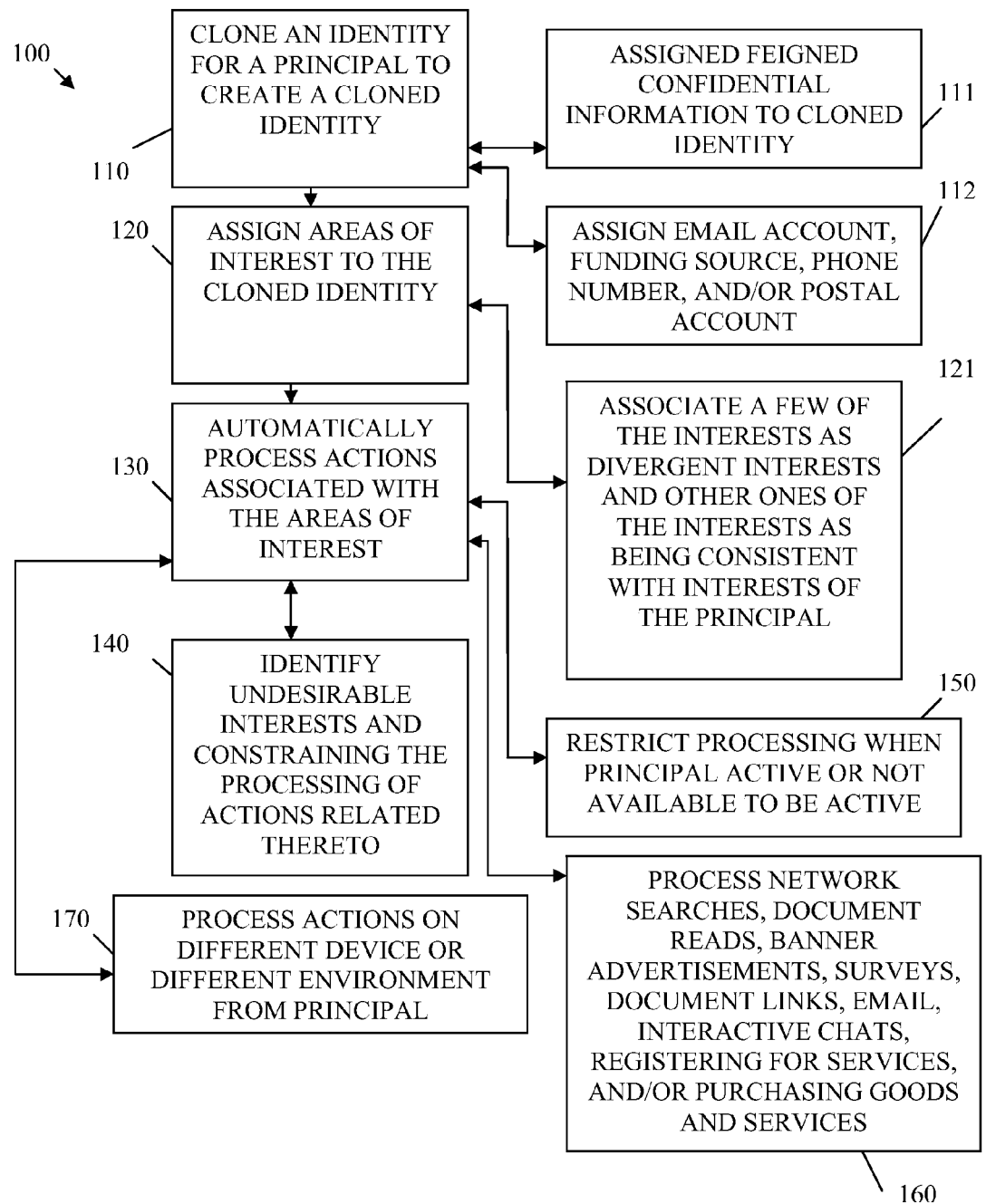
FIG. 1 is a diagram of a method for processing a cloned identity over a network, according to an example embodiment.

A "resource" includes a user, service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from a one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger.

A "clone" is another identity that is associated with a principal and appears to be the principal to others that interact or monitor the clone over the network. A clone is processed by an automated agent or service over the network, such as the Internet, and performs actions representing network transactions. The actions processed are driven by areas of interest assigned to the clone. A majority of these areas of interest are intentionally defined to be divergent from the principal to whom the clone is associated. Any network eavesdroppers, which are performing dataveillance on a principal, are polluted by the transactions that are in fact divergent from the true principal's areas of interest. In this manner, data collection is not prevented; rather, it is intentionally polluted so as to make any data collection about a principal less valuable and less reliable.

The principal of a clone may be viewed as a "true persona" (TP) and the clone may be viewed as a "doppelganger" or "dead ringer clone" that exhibits the behavior of the TP. This allows the TP to continue its existence over a network, such as the Internet, in secret.

In some embodiments, the areas of interest for a principal and a clone are constructed as semantic aspects and represented in a formal manner. Examples of such techniques include U.S. Ser. No. 09/615,726, entitled "A Method and Mechanism for the Creation, Maintenance and Comparison of Semantic Abstracts," filed on Jul. 13, 2000; U.S. Ser. No. 09/512,963, entitled "Construction, Manipulation, and Comparison of a Multi-Dimensional Semantic Space," filed on Feb. 25, 2000; U.S. Ser. No. 09/691,629, entitled "Method and Mechanism for Superpositioning State Vectors in a Semantic Abstract, filed on Oct. 18, 2000; and U.S. Pat. No. 6,108,619, entitled "Method and Apparatus for Semantic Characterization of General Content Streams and Repositories," issued on Aug. 22, 2000. The disclosures of which are incorporated by reference herein.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

FIG. 1 is a diagram of a method 100 for processing a cloned identity over a network, according to an example embodiment. The method 100 (hereinafter "cloning service") is implemented in a machine-accessible and readable medium. The cloning service is operational over and processes within a network. The network may be wired, wireless, or a combination of wired and wireless. In an embodiment, the cloning service acts as an automated agent that uses policies and other metadata to perform the processing depicted in FIG. 1 and described herein and below.

Initially, at 110, a principal's identity is cloned to form or create a cloned identity. That is, identifiers used to authenticate the principal are provided to the cloning service for purposes of posing as the principal. The cloning service acts as if it is the principal and performs automated processing over a network. The processing reflects transactions or actions over the network According to an embodiment, the network is the Internet and the actions processing reflects automated activities processed within a World-Wide Web (WWW) browser controlled by the cloning service, which masquerades as the principal.

In an embodiment, at 111, the cloned identity may have feigned confidential information assigned or associated with the cloned identity. This may include life statistics, such as data of birth, birthday club, gender, income level, marital status, number and ages of children, hair color, etc. This information may actually substantially correspond to the life statistics of the principal so as to strengthen the likelihood that the cloned identity will be accepted by eavesdroppers as the principal.

In more embodiments, at 112, the cloned identity may also be assigned an email account of its own for its own use; a funding source, such as a credit card or debit card; a phone number with a voice mail; or even a postal account, such as a Post Office (P.O.) box. This information and capabilities provided to the cloned identity and accessible to the cloning service further enhances the believability and apparent legitimacy of the cloned identity as being the principal.

At 120, the cloning service is initially configured by being assigned areas of interest for use with the cloned identity. The areas of interest are semantic areas, categories, or subjects that are related to transactions or actions over the network. For example, an area of interest may be photography or even more specifically photography of nature, such as mountains, sunsets, etc.

According to an embodiment, the areas of interest are represented in a formal manner within a data structure that is parsed and processed by the cloning service. The data structure may include identifiers for topics or areas of interest and may be further linked to lexicons and actions associated with each area of interest. In some cases, the data structure may be a vector of different areas of interest and may include weights for each particular area of interest. In fact, any formal manner for representing categories, subjects, or actions within a data structure may be used to depict the semantic areas of interest.

For example, the areas of interest may be represented as semantic abstracts or other data structures that provide for a robust semantic evaluation. Examples techniques for achieving this were supplied above and incorporated by reference herein.

In some embodiments, the areas of interest are manually supplied via separate interfaces by a principal that seeks to use the cloning service for purposes of establishing the clone. The interface may provide, in a structured and controlled manner, screen selections and input mechanisms for the principal to interactively define and generate the areas of interest for the clone.

In other embodiments, the areas of interest may actually be automatically derived on behalf of the principal given an existing principal's profile or desired areas of interests. The profile may be partially and automatically assembled for the principal by analyzing existing information about the principal, such as the principals Internet browser history, browser cache, cookies, etc.

In still other embodiments, the principal's identity may be semantically associated with a particular category, such as an employee, which permits the cloning service to acquire policies associated with employee identities and to further derive areas of interest for employees of a particular organization or profession.

According to an embodiment, at 121, a few of the areas of interest may actually be divergent areas of interest from that of the principal. Furthermore, at 121, some others of the areas of interest may actually be consistent with the interests of the principal. By incorporating consistent areas of interest with the principal into the cloned identity, the interests of the principal are feathered into the cloned identity so that the cloned identity is more believable to eavesdroppers that are attempting to perform dataveillance on the principal. The divergent areas of interest work to pollute the dataveillance as is described more fully below.

At 130, the cloning service automatically processes one or more actions that are consistent with the areas of interest associated with the cloned identity. The actions may be any transaction that a principal may engage in over the network. For example, the cloning service may process an area of interest that is divergent from that of the principal such as an interest in basket weaving. This particular interest may be associated with its own lexicon and actions associated with particular Internet websites, products, services, and/or books. Actions may be defined that permit the cloning service to appear to be the principal and visit specific basket weaving websites, issue Internet searches related to basket weaving, and the like. This activity by the cloning service may be picked up by an eavesdropper and may be used to generate a polluted profile about the principal that suggests the principal is interested in basket weaving, when in fact this is not the case.

According to an embodiment, at 140, the cloning service may use policies to identify undesirable interests and/or actions for purposes of constraining or preventing certain actions from being processed that are associated with these undesirable types of interests. In this manner, the cloning service may be configured to perform lawful activities and activities that are not deemed morally reprehensible even if such activities are considered lawful. This ensures that activity of the cloning service is not going to embarrass the principal or potentially cause the principal legal problems from activities such as downloading pirated intellectual property, pornography, and the like.

In an embodiment, at 150, the cloning service may also be configured to restrict when and if the cloning service performs any of the actions. This may be done to prevent detection of the cloning service. For example, the cloning service may not be active when the principal is on the network and performing actions or transactions. Similarly, if the principal is not likely to be online on the network, then the cloning service is also configured to not be online. As an example, the principal may be scheduled to be on a flight during a certain date and time; during this period it may not be desirable for the cloning service to be active since an eavesdropper may detect this anomaly and may potentially detect the cloned identity. To ensure that cloning service is not operating when it should not be, the principal may manually instruct the cloning service to be down on certain dates and times. Alternatively, the cloning service may automatically detect situations where it is not desirable for it to be online, such as when it detects the principal online or for periods when it is unlikely the principal would be online, such as late at night, during a holiday, vacation, etc.

In some embodiments, at 160, the cloning service may perform a wide range of automated actions consistent with the assigned areas of interest. Examples of these actions may include, but are not limited to, performing an Internet search on a given area of interest; activating selective results that when analyzed conform semantically to the area of interest; activating advertisement banners in web pages; filling out electronic surveys; sending an email; engaging in rudimentary online chat discussion by using techniques similar to Eliza (an automated chat engine); activating embedded links within a document that conforms semantically to the area of interest; registering for services associated with the area of interest; purchasing goods or services related to the area of interest, etc.

According to an embodiment, at 170, the cloning service processes the actions on a different device than the principal's native device. This device may be close physical proximity to the principal so as to appear to be the principal to more sophisticated eavesdroppers. In some cases, the environments may be different between the cloning service and the principal. By separating the processing devices and/or environments of the cloning service and the principal, it becomes more difficult for eavesdroppers to detect activities associated with the clone and activities associated with the principal, and by making the devices or environments similar and/or in close proximity the eavesdroppers are less likely to even discover the cloned identity.

It is now understood how a novel cloning service may be implemented to thwart the growing problem of dataveillance. The service does not seek to prevent data gathering; rather, the service uses a cloned identity of a principal to automatically and actively process actions according to areas of interest over a network so as to appear to eavesdroppers to be the principal. The actions of the cloning service are in fact designed to pollute the data collected by the eavesdroppers and make electronic profiles, which are derived about the principal less reliable and less valuable to the eavesdroppers.

Figure 2:
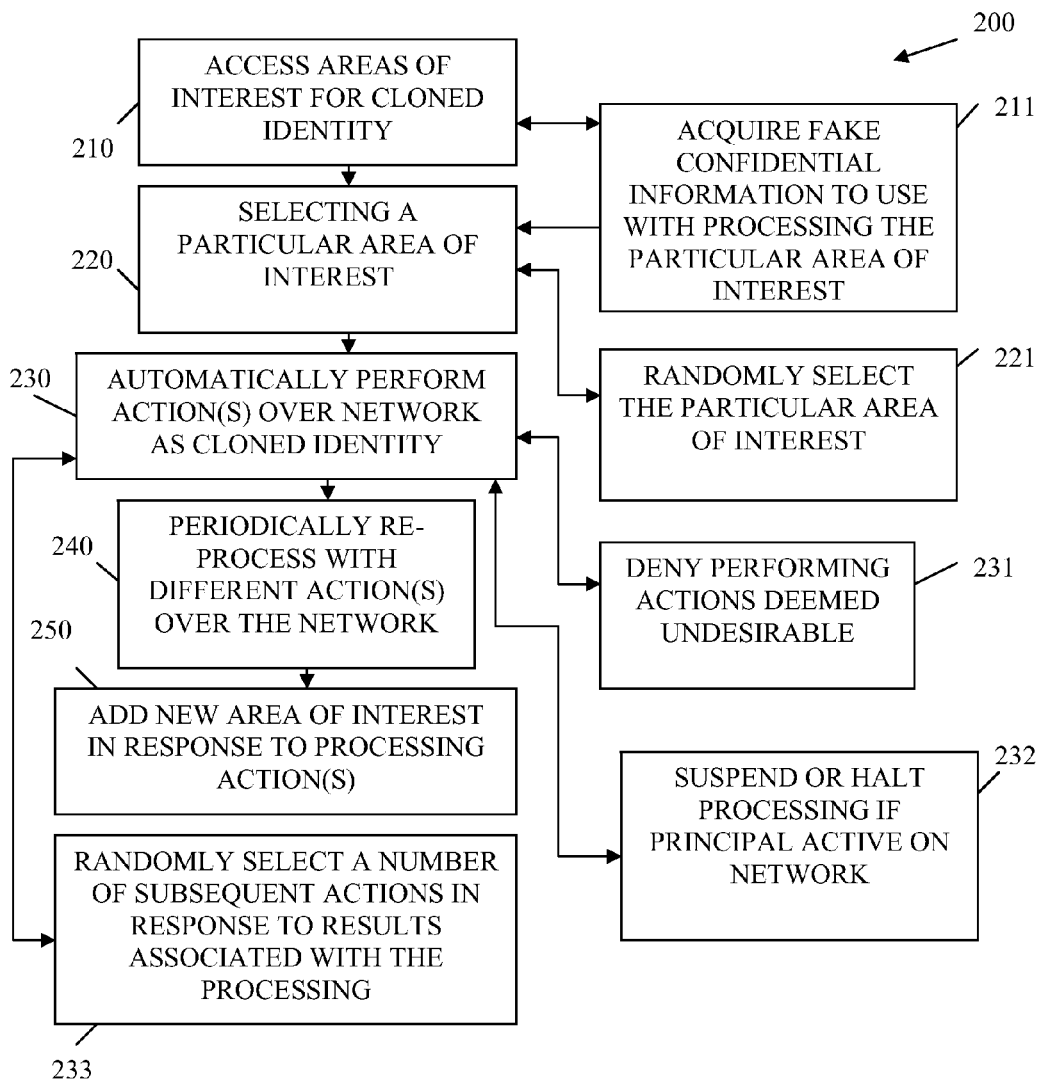
FIG. 2 is a diagram of another method for processing a cloned identity over a network, according to an example embodiment.

FIG. 2 is a diagram of another method 200 for processing a cloned identity over a network, according to an example embodiment. The method 200 (hereinafter "cloning agent") is implemented in a machine-accessible and readable medium and is operational and accessible over a network. The network may be wired, wireless, or a combination of wired and wireless. The cloning agent represents an alternative view to the processing depicted above with the cloning service, described with the method 100 of the FIG. 1.

Initially, a cloned identity for a principal is established. This may be achieved in any manner where an electronic identity is assigned to the principal and assumed by other resources on the network to in fact be the principal. The cloned identity is exclusively used by the cloning agent for purposes of polluting dataveillance and electronic profiles generated by eavesdroppers about the principal.

The cloned identity includes a variety of metadata, such as areas of interest, policies, and/or profiles that drive the processing of the cloning agent with respect to posing as the principal over the network. The cloning agent, during its operation is fully automated and does not require manual interaction or direction.

At 210, the cloning agent accesses a portion of the metadata associated with areas of interest for the cloned identity. Again, the structure of the areas of interest may include semantic definitions and other data (e.g., area-specific lexicons, area-specific websites, area-specific services, area-specific actions, etc.). In some cases the structure of the data structure representing the areas of interest may impart preference, a weight, or even a vector for each of the areas if interest defined therein.

According to an embodiment, at 211, the cloning agent may also acquire metadata for the cloned identity associated with fake or partially fake confidential information for use when processing a particular area of interest. That is, it may be desirable to have some confidential information be legitimate so as to prevent an eavesdropper from distinguishing between the clone and the principal, some of this confidential information may include a birth date, an age, etc. Whereas, other confidential information may be profitably non-legitimate, such as credit card number, phone number, etc. The fake or feigned confidential information may be housed in cookies for the cloned identity and used automatically by the cloning agent when performing certain actions. In other cases, the confidential information may be directly supplied by the cloning agent when performing actions over the network with other services.

It is noted that some or perhaps even a majority of the areas of interest are intentionally designed to be divergent from legitimate or true interests of the principal. However, some others or perhaps even a minority of the areas of interest are in fact consistent with the interests of the principal. The consistent areas of interest are again a mechanism from preventing a savvy eavesdropper from detecting the cloned identity and distinguishing it from the principal. The divergent areas of interest are designed to pollute dataveillance or electronic profiling carried out by the eavesdropper against the principal.

It should also be noted that over time an eavesdropper will begin to associate divergent areas of interest for the clone as being the norm for a particular principal that the eavesdropper believes it is profiling or performing successful dataveillance on. When this is detected or suspect, the areas of divergent interests may be increased for the clone without fear of detection, because the divergent interests are now believed by the eavesdropper to be the norm.

At 220, the cloning agent selects a particular area of interest for processing. The selected area of interest may be systematically selected based on a configuration of the cloning agent, such that areas of interest are all equally processed in defined orders or in a serial fashion. Alternatively, at 221, the particular area of interest may be randomly selected for the available areas of interest.

At 230, the cloning agent automatically performs actions over the network (e.g., Internet via the WWW, etc.) posing as the cloned identity and appearing to eavesdroppers to be the principal. Again, a variety of actions may be automatically processed, such as but not limited to, sending email, reading documents, activating links, registering with services, making purchases, engaging in on-line chat, taking surveys, issuing searches, and others. The action processed may correspond to a divergent area of interest from that which is associated with the principal. Thus, any eavesdroppers performing electronic profiling or dataveillance against the principal will be polluted when that action is detected and recorded over the network by the eavesdroppers. This can lead to the creation of inconsistent and unreliable profiles that are not valuable and confusing to the eavesdroppers.

According to an embodiment, at 231, the cloning agent may deny performing any action that it deems undesirable. Undesirable actions may be defined by policy and may include illegal activities and/or morally reprehensible activities, such as but not limited to, downloading pirated intellectual property, downloading obscene material, gambling, and the like.

In yet another embodiment, at 232, the cloning agent may suspend, halt, or prevent processing any action if the principal is detected to be active on the network. That is, the cloning agent is configured to not be active on the network when the principal is active on the network. In this manner, eavesdroppers will not be able to distinguish or detect the cloned identity from the principal. This may also be more complex, such that the cloning agent is intentionally inactive for periods during which it is unlikely or nearly impossible for the principal to be active on the network. Still further, the principal may have an interface to manually shut down the cloning agent when the principal feels it is profitable to do so to avoid detection.

In an embodiment, at 233, the cloning agent may randomly select a number of subsequent actions in response to results acquired from the processing of the actions. That is, suppose the cloning agent performed an Internet search as an action that conformed to a lexicon of search terms derived from the selected area of interest. The search returns results and the results may be semantically analyzed or scored for relevance to the selected area of interest. The top tier of results may then be randomly selected or activated and processed with other subsequent actions, such as reading the documents, activating hypertext links within selected documents, etc. This makes the cloning agent appear to be a legitimate principal and provides depth to the principal making it more difficult for any eavesdropper to detect the cloned agent.

At 240, the cloning agent periodically re-processes the method 200 or re-iterates its own processing for different actions over the network. The different actions may conform to the selected area of interest or conform to a different area of interest. The frequency of iteration may be defined in a profile or configuration for the cloning agent and may be designed to make the cloning agent appear to be a legitimate and real principal to eavesdroppers.

In some embodiments, at 250, the cloning agent may also dynamically and automatically add new area of interest to the existing areas of interest associated with the cloned identity. This may occur when the cloning agent is engaging in network activity and related areas of interest are detected that similar or related to existing areas of interest for the cloned identity. Again, this makes it appear to an eavesdropper that the cloned identity is a real and legitimate principal, whose routines are not uniform and systematic but appear to be associated with interests and exhibit human characteristics or behaviors.

The more the cloning agent appears to be a legitimate and an autonomous entity over the network that acts in a consistent manner, the more difficult it will be for eavesdroppers to detect the subterfuge. Therefore, the cloning agent is designed to exhibit characteristics in manners expected by users or human network resources. The characteristics are intentionally varied to appear to be non systematic and to take on an autonomous appearance. However, the actions taking are designed to pollute electronic profiling or dataveillance associated with a principal. Thus, data collection is not prevented; rather, it is encouraged for the cloned identity and intentionally populated with divergent information that pollutes legitimate information gathered about the principal.

Figure 3:
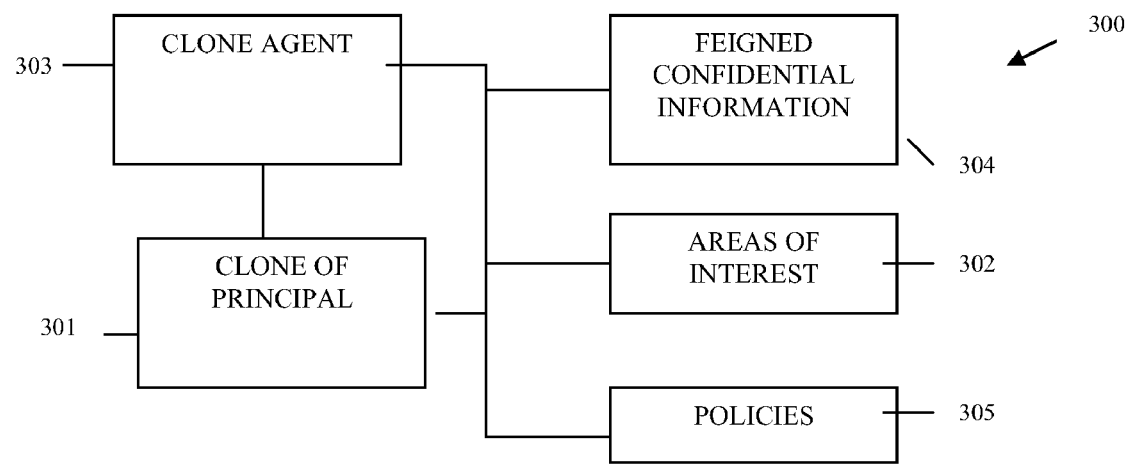
FIG. 3 is a diagram of a cloned identity system, according to an example embodiment.

FIG. 3 is a diagram of a cloned identity system 300, according to an example embodiment. The cloned identity system 300 is implemented in a machine-accessible and readable medium and is operational over a network. The network may be wired, wireless, or a combination of wired and wireless. In an embodiment, the cloned identity system 300 implements, among other things, the processing of the methods 100 and 200 of the FIGS. 1 and 2, respectively.

The cloned identity system 300 includes a clone of a principal 301, one or more areas of interest 302, and a clone agent 303. In some embodiments, the cloned identity system 300 may also include feigned confidential information 304 and/or one or more policies 305. Each of these will now be discussed in turn.

The clone of the principal 301 (hereinafter "clone 301") represents an electronic identity that is associated with the principal. To assume the clone 301, various identifiers and/or authentication techniques may be acquired and established, such that the clone 301 appears to eavesdroppers of the network to in fact be the principal.

The areas of interest 302 represent metadata assembled in one or more data structures, which define categories or subjects of interest from the clone 301. In an embodiment, the areas of interest may be logically viewed as semantic abstracts, which summarize a variety of information for a variety of areas of interest 302 for the clone 301.

The areas of interest 302 are semantically correct and a few of the areas of interest 302 are typically divergent from the interests of the true principal to which the clone 301 is associated. However, some or others of the areas of interest 302 are in fact consistent with the interests of the principal so as to feather the clone's identity with the principal's identity. That is, having some overlap within the areas of interest 302 makes it difficult for an eavesdropper to tell who the clone 301 is and who the principal is. Related information may also be associated with the areas of interest 302, such as area-specific lexicons, area-specific services, area-specific WWW sites, area-specific actions, etc.

The clone agent 303 is designed to process actions over the network consistent with the areas of interest 302 using the identity associated with the clone 301. To do this, the clone agent 303 consumes the areas of interest 302 and takes automated actions over the network under the identity of the clone 301. Examples of processing for a clone agent 303 were presented above with respect to the methods 100 and 200 of the FIGS. 1 and 2, respectively.

In an embodiment, the cloned identity system 300 may also included feigned confidential information 304. That is, some confidential information 304 associated with the clone 301 may be manufactured whereas other confidential is legitimate so as to not blow the cover of the clone 301. Some manufactured confidential information may include, but is not limited to, a phone number, an email account, a credit or debit card account, and the like.

It is to be understood that although the confidential information 304 is labeled as feigned, manufactured, or fake, that it is still legitimate meaning that it may exist but it will not be used by the principal to which it purports to belong; rather it is used by the clone 301 and is used for duplicity against eavesdroppers. So, as an example a phone number for the clone 301 may include a legitimate number with a voice mail service; but the phone number is fake or feigned in the sense that it is used by the clone 301 and not the principal.

According to another embodiment, the cloned identity system 300 may also include one or more policies 305. The policies 305 define processing limitations and configurations for the clone agent 303. Thus, some policies 305 may prevent the clone agent 303 from taking inappropriate actions (e.g., illegal, obscene, or socially undesirable). Other policies 305 may dictate or drive when and if the clone agent 303 actually is active over the network. For example, a policy 305 may prevent the clone agent 303 from being active over the network when the principal is active over the network or when it is highly unlikely that the principal would be active over the network. This ensures that the cover of the clone 301 is maintained against savvy or sophisticated eavesdroppers.

Figure 4:
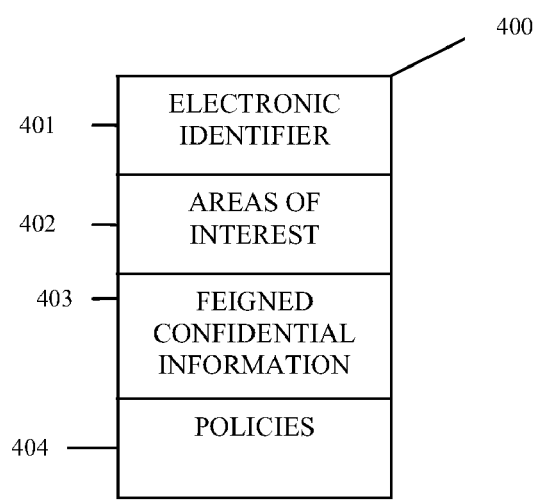
FIG. 4 is a diagram of a data structure implemented in a machine-accessible medium representing a cloned identity, according to an example embodiment.

FIG. 4 is a diagram of a data structure 400 implemented in a machine-accessible medium representing a cloned identity, according to an example embodiment. The data structure 400 encapsulates data and metadata related to a cloned identity. The data structure 400 is implemented within a machine-accessible medium and when processed causes actions and states to change within a machine, in the manners described herein and below.

According to an embodiment, the data structure 400 is read, populated, updated, and used to drive the processing of the methods 100 and 200 of the FIGS. 1 and 2. Moreover in some cases, the data structure 400 is read, populated, updated, and used to drive the processing of the clone agent 303 of the cloned identity system 300 of the FIG. 3.

The data structure 400 includes an electronic identifier 401, one or more areas of interest 402, and feigned confidential information 403. In some embodiments, the data structure 400 may also include one or more policies 404. Each of these will now be discussed in turn.

The electronic identifier 401 represents a clone of a principal. An agent uses the electronic identifier 401 and other information to authenticate to services over the network as if it were the principal. That is, when the agent performs network actions or transactions it assumes and uses the electronic identifier 401 that makes it appear to eavesdroppers to be the principal.

The areas of interest 402 are metadata formed as one or more other sub-data structures, which are associated with the electronic identifier 401 of the clone. Examples of such sub-data structures and areas of interest 402 were provided above with respect to the methods 100 and 200 of the FIGS. 1 and 2 and with respect to the cloned identity system 300 of the FIG. 3. The agent reads, processes, and updates the areas of interest 402 when managing the data structure 400.

In an embodiment, the areas of interest 402 may be initially derived or formed in an automated manner by the agent when the agent is provided legitimate areas of interest for the principal or when the agent is able to automatically derive legitimate areas of interest for the principal. In other embodiments, the areas of interest 402 may be manually configured by a principal. In still other situations, the areas of interest 402 may be partially automatically populated to the data structure 400 by the agent and manually modified or overridden by the principal. Under still more circumstances, the agent may add, modify, or otherwise augment the areas of interest 402 dynamically as the agent processes of the network in response to actions taken and results analyzed by the agent. The areas of interest 402 are dynamic and evolving and controlled or under the supervision of the agent.

The feigned confidential information 403 provides additional identifiers that the agent may use while processing over the network as the clone so as to convince eavesdroppers that the clone is legitimate or is in fact the principal. The confidential information 403 is feigned in the sense that it belongs to the clone and not to the principal. Thus, the confidential information may be associated with real resources (e.g., phones, email accounts, postal mail accounts, etc.) but it is not really associated with the principal as it purports to be. In some cases, some of the feigned confidential information 403 may not be feigned at all so as to make the subterfuge of the clone appear to be more legitimate. Examples of such situations were provided above with the methods 100 and 200 of the FIGS. 1 and 2 and with cloned identity system 300 of the FIG. 3.

According to an embodiment, the data structure 400 may also include one or more policies 404. The policies 404 prevent the agent from processing undesirable actions on behalf of the clone, which may be associated with undesirable content. Additionally, policies 404 may restrict when and if the agent is active on the network so as to prevent detection of the clone by eavesdroppers.

It is now understood how techniques may be used to pollute electronic profiling of principals over a network. This circumvents the reliability and usefulness of dataveillance used by network eavesdroppers and effectively provides greater privacy over the network to principals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A device-implemented method, comprising:
cloning, by a device, an identity for a principal to form a cloned identity;
configuring, by the device, areas of interest to be associated with the cloned identity, the areas of interest are divergent from true areas of interest for a true identity for the principal; and
automatically processing actions associated with the areas of interest for the cloned identity over a network to pollute information gathered by eavesdroppers performing dataveillance on the principal and refraining from processing the actions when the principal is detected as being logged onto the network and also refraining from processing the actions when the principal is unlikely to be logged onto the network.

2. The method of claim 1, wherein cloning further includes assigning some identity information for the cloned identity that accurately reflects the true identity for the principal to make the cloned identity more believable to the eavesdropper.

3. The method of claim 2, wherein cloning further includes assigning other identity information for the cloned identity that is feigned confidential information not in any way associated with the true identity for the principal.

4. The method of claim 1, wherein cloning further includes assigning a feigned financial account and email account to the cloned identity.

5. The method of claim 1, wherein configuring further includes automatically deriving, by the device, the true areas of interest for the principal based on prior actions of the principal while logged into the network.

6. The method of claim 5, wherein automatically deriving further includes obtaining some of the true areas of interest from Internet browser history, browser cache, and cookies for the principal.

7. The method of claim 1, wherein automatically processing further includes engaging in on-line chat conversations in an automated manner as some of the actions.

8. The method of claim 1, wherein automatically processing further includes processing the actions on a different device and different processing environment from that which the principal uses with the true identity while on the network.

* * * * *